(12) United States Patent
Kolody et al.

(10) Patent No.: US 6,359,770 B1
(45) Date of Patent: Mar. 19, 2002

(54) POWER DISTRIBUTION CIRCUIT BOARD WITH BULLET CONNECTORS

(75) Inventors: Timothy Kolody, Lorain; Scott C. Lewis, Amherst; Richard E. Trifiletti, Lorain; Duncan E. Estep, North Ridgeville, all of OH (US); Steven T. McWilliams, Lakewood (GB)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 09/703,120

(22) Filed: Oct. 31, 2000

(51) Int. Cl.⁷ .................................................. H02B 1/26
(52) U.S. Cl. ........................ 361/626; 361/630; 361/776; 361/639; 361/823; 361/824; 361/833; 361/775; 379/331; 439/84; 439/709
(58) Field of Search ................................ 361/119, 124, 361/622, 624, 627–640, 760, 774–776, 781–782, 807–811, 822–824, 826, 833–834; 439/76.1, 76.2, 49, 61, 84, 709; 379/327, 329, 331

(56) References Cited

U.S. PATENT DOCUMENTS

| 4,924,213 | A | * | 5/1990 | Decho et al. ................ 439/709 |
| 5,291,376 | A | * | 3/1994 | Mills ........................... 361/823 |
| 5,442,519 | A | * | 8/1995 | Debalko et al. ............ 361/784 |
| 5,966,295 | A | * | 10/1999 | Park ........................... 361/823 |
| 6,002,580 | A | * | 12/1999 | Le Vantine et al. ......... 361/634 |

* cited by examiner

Primary Examiner—Gregory Thompson
(74) Attorney, Agent, or Firm—Jones, Day, Reavis & Pogue

(57) ABSTRACT

A telecommunications power distribution circuit board carries a fuse holder for a plurality of GMT fuses through which power is supplied to connectors on a terminal block. Power is supplied to the fuses through a distribution circuit on the board by way of bullet connectors that are attached to the circuit board and plug into holes in a power supply bus bar.

6 Claims, 10 Drawing Sheets

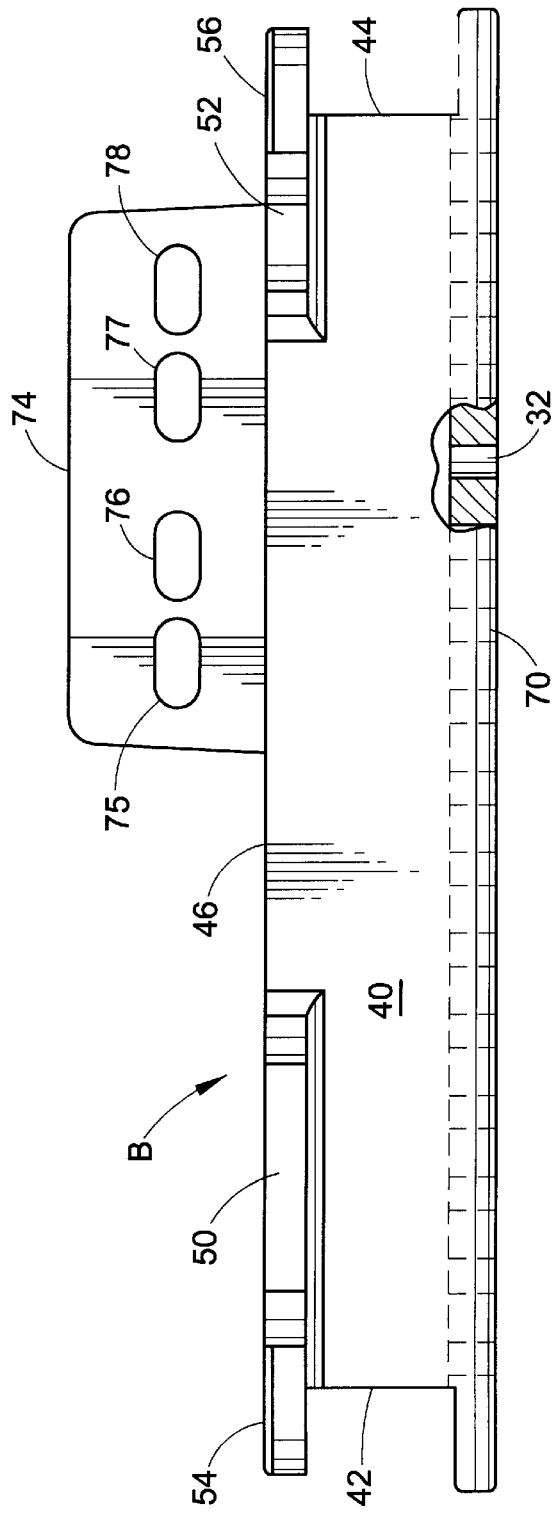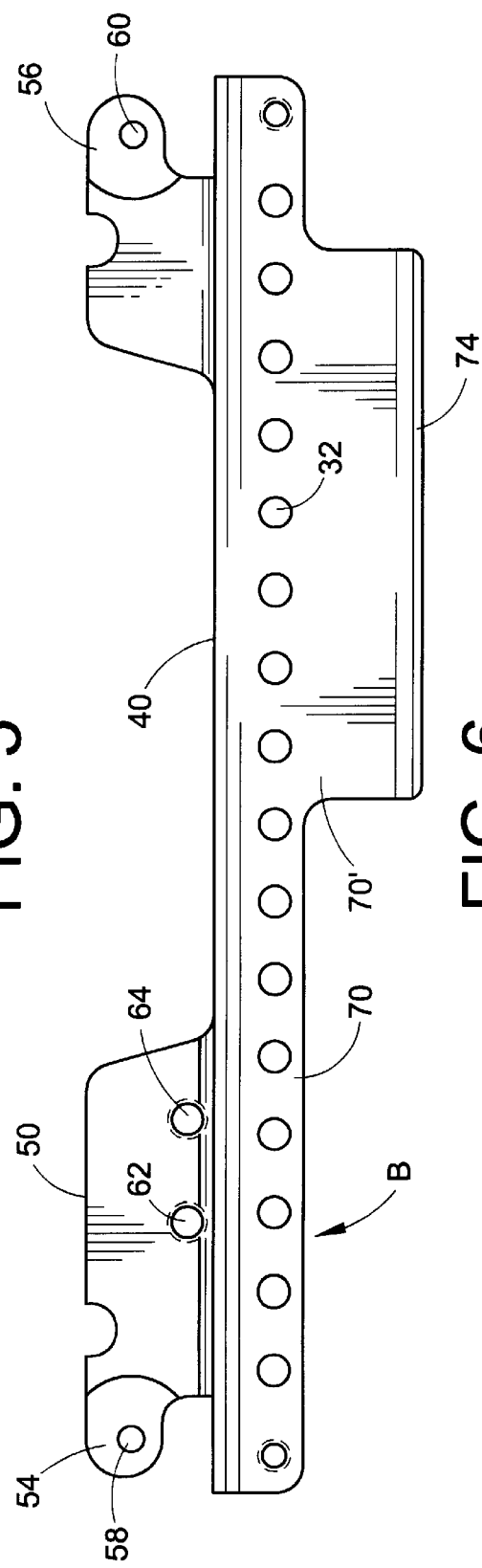

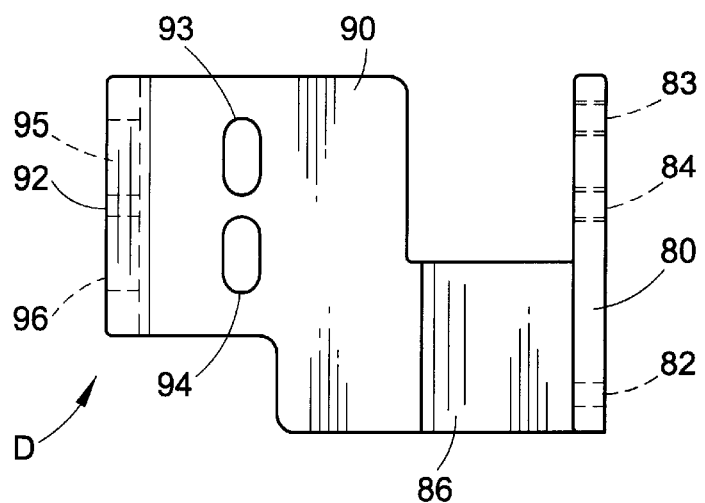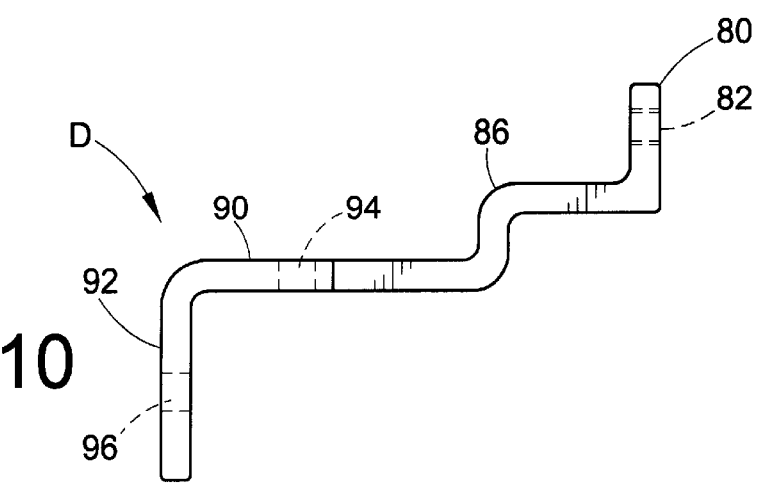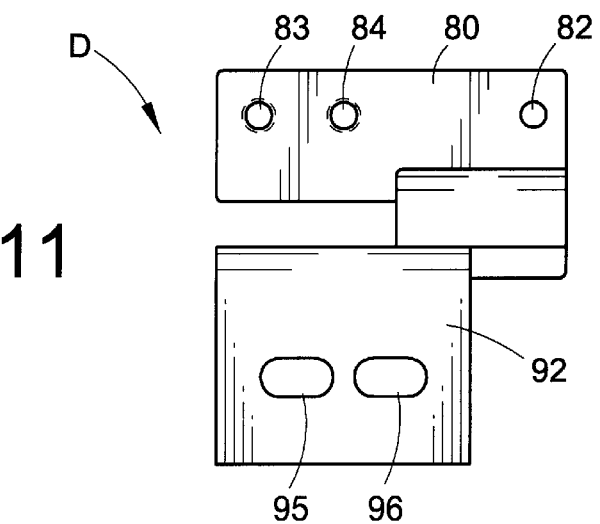

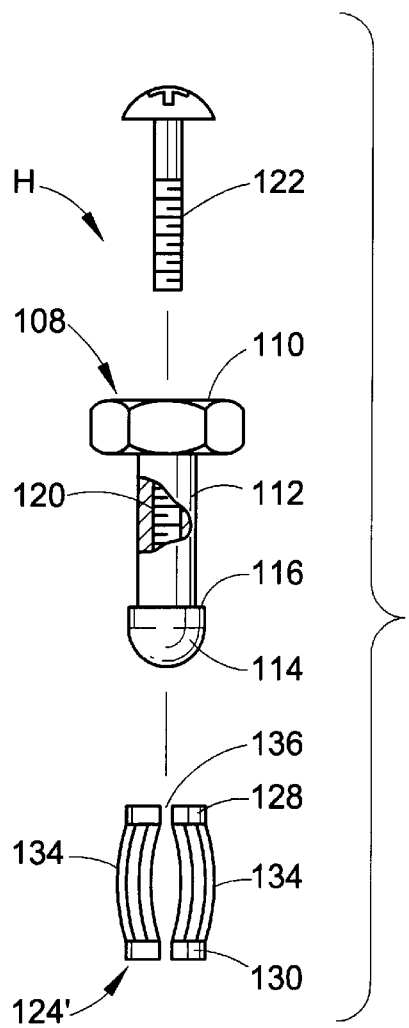
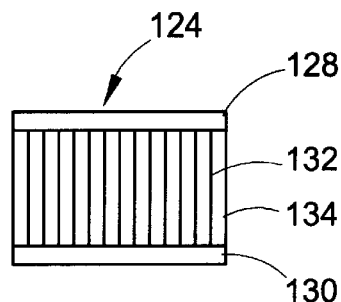
FIG 18
FIG 19
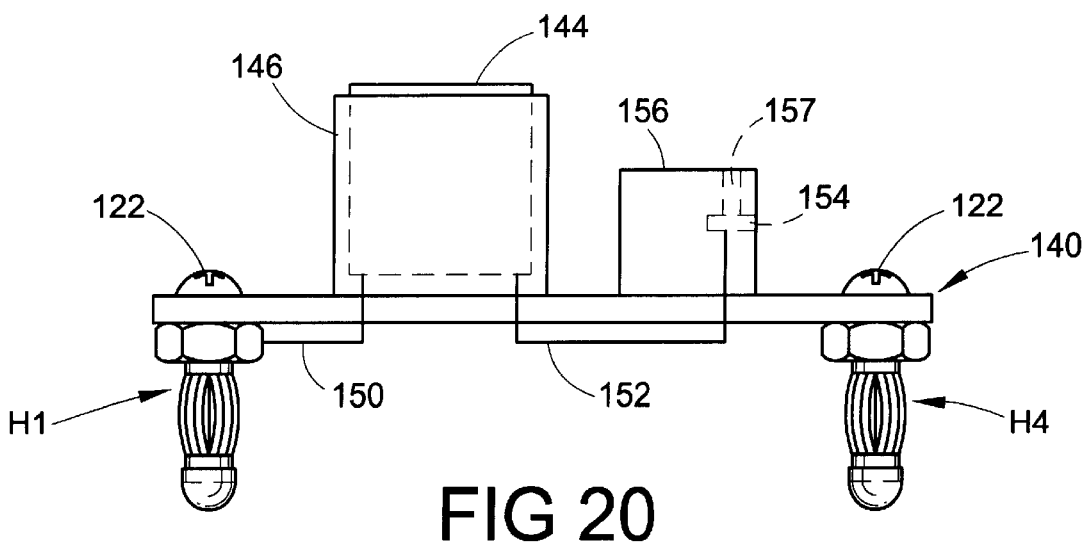
FIG 20

POWER DISTRIBUTION CIRCUIT BOARD WITH BULLET CONNECTORS

BACKGROUND OF THE INVENTION

This application relates to the art of power distribution and, more particularly, to a power distribution circuit board for distributing power from a bus bar to equipment through a plurality of circuit interrupters carried by the circuit board. The invention is particularly applicable for use with telecommunications equipment and will be described with specific reference thereto. However, it will be appreciated that the invention has broader aspects and can be used for power distribution in other environments.

Power distribution panels for telecommunications applications commonly have a power supply bus bar for transferring power to individual power supply blocks which in turn are connected to telecommunications equipment. The bus bar and power supply blocks have holes for receiving bullet connectors on circuit breakers. The only way that a customer can obtain power from the power distribution panel is by connecting to individual power supply blocks. It would be desirable to provide a customer with the option of obtaining power through circuit interrupters other than circuit breakers, such as GMT telecommunications fuses.

SUMMARY OF THE INVENTION

A power distribution board has bullet connectors that are received in holes in a power supply bus bar and in power distribution blocks on a power supply panel.

In accordance with the present application, the power distribution circuit board has a fuse holder for a plurality of side-by-side GMT fuses through which power is supplied to power output connectors on a terminal block carried by the circuit board.

Power is supplied to the fuse sockets through bullet connectors that are attached to the circuit board and plug into holes in a power supply bus bar. The number of bullet connectors used can be varied depending on the power requirements. By way of example, each bullet connector is capable of an amperage rating of at least 70 amps while remaining cool enough to obtain approval by Underwriters Laboratories.

The power supply circuit board increases the number of power supply terminals that are available and gives a customer the option of using fuses or other circuit interrupters having different amperage ratings.

It is a principal object of the invention to provide an improved power distribution circuit board for use with a DC power supply panel for telecommunications applications.

It is another object of the invention to provide a power distribution circuit board having bullet connectors for reception in holes in a power supply bus bar.

It is another object of the invention to provide an improved power distribution circuit board that enables the use of GMT fuses or other circuit interrupters on a telecommunications power supply panel.

It is an additional object of the invention to provide a power distribution circuit board that expands the number of equipment connections that can be made to a DC power supply panel.

BRIEF DESCRIPTION OF THE DRAWING

FIG. 5 is a top plan view thereof;

FIG. 6 is a side elevational view thereof;

FIG. 9 is a top plan view thereof;

FIG. 10 is an end elevational view thereof;

FIG. 11 is a rear elevational view thereof;

FIG. 18 is an exploded view of a typical bullet connector;

FIG. 19 is an elevational view of a spring contact member used in the bullet connector of FIG. 18;

FIG. 20 is a side elevational view of a power distribution circuit board having bullet connectors thereon;

DESCRIPTION OF PREFERRED EMBODIMENTS

Figure 1:
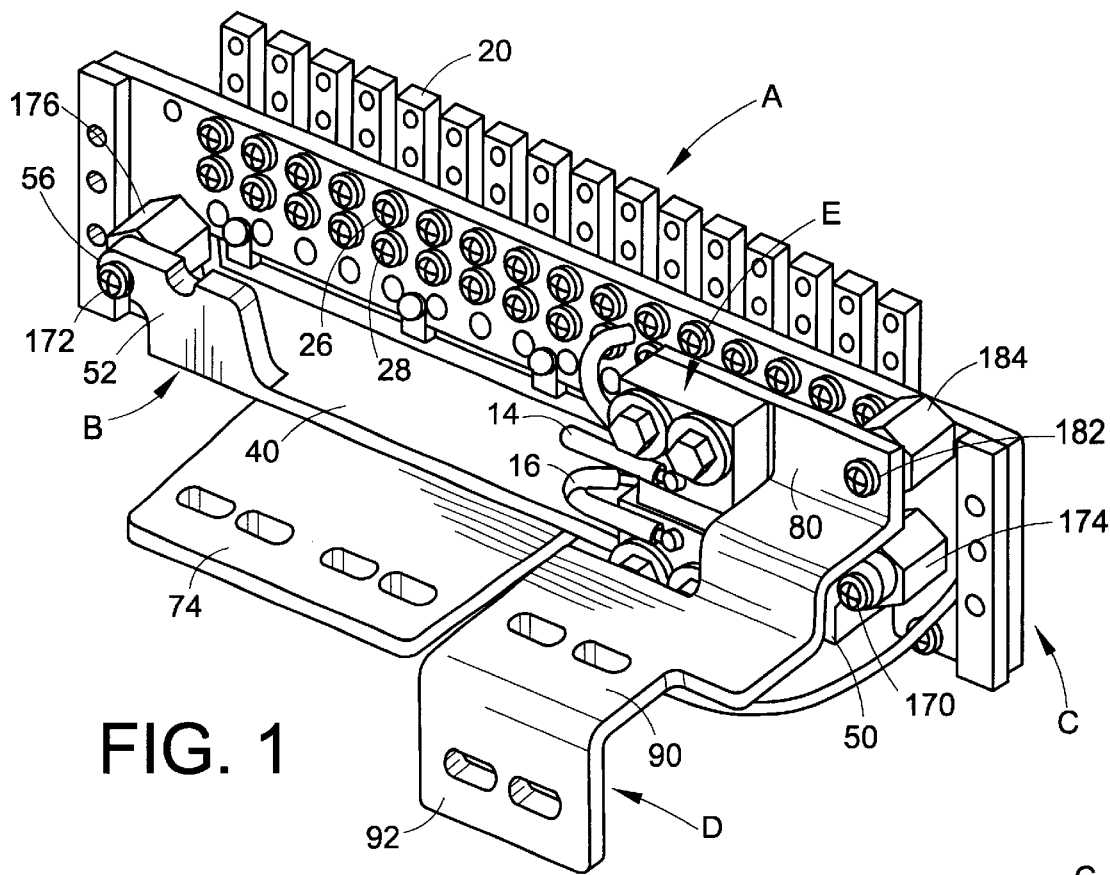
FIG. 1 is a perspective illustration of a telecommunications power distribution panel in accordance with the present application.
Figure 2:
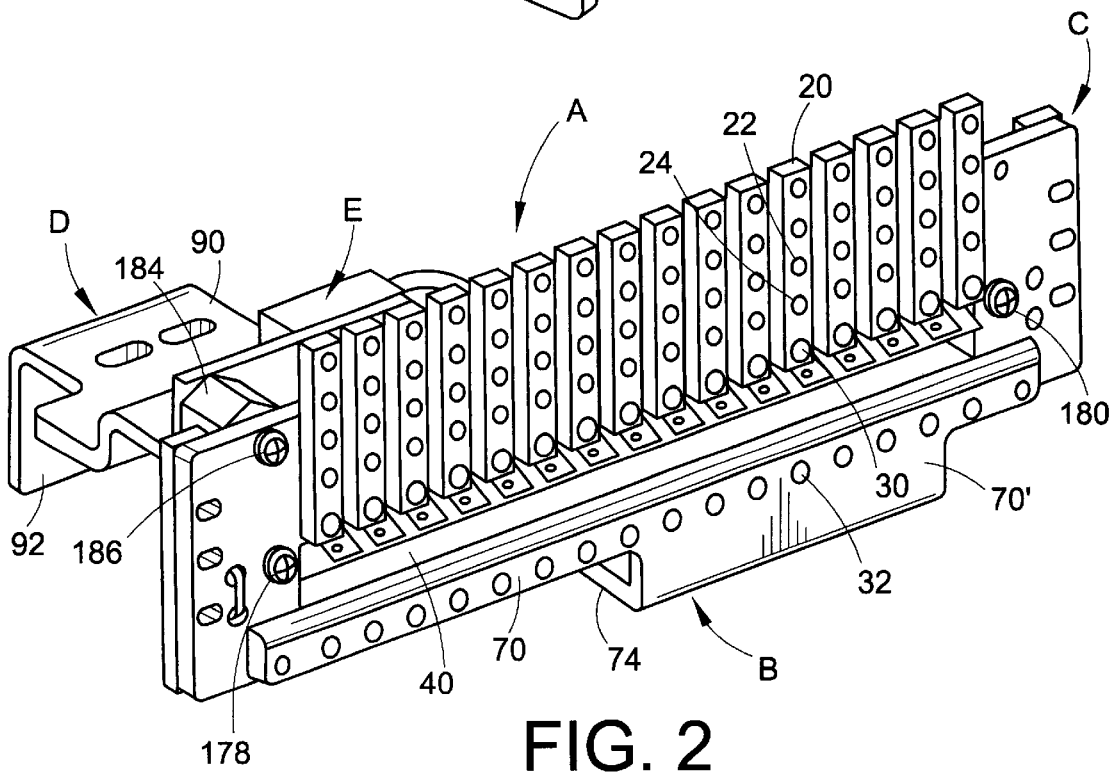
FIG. 2 is another perspective illustration looking at the opposite side thereof.
Figure 3:
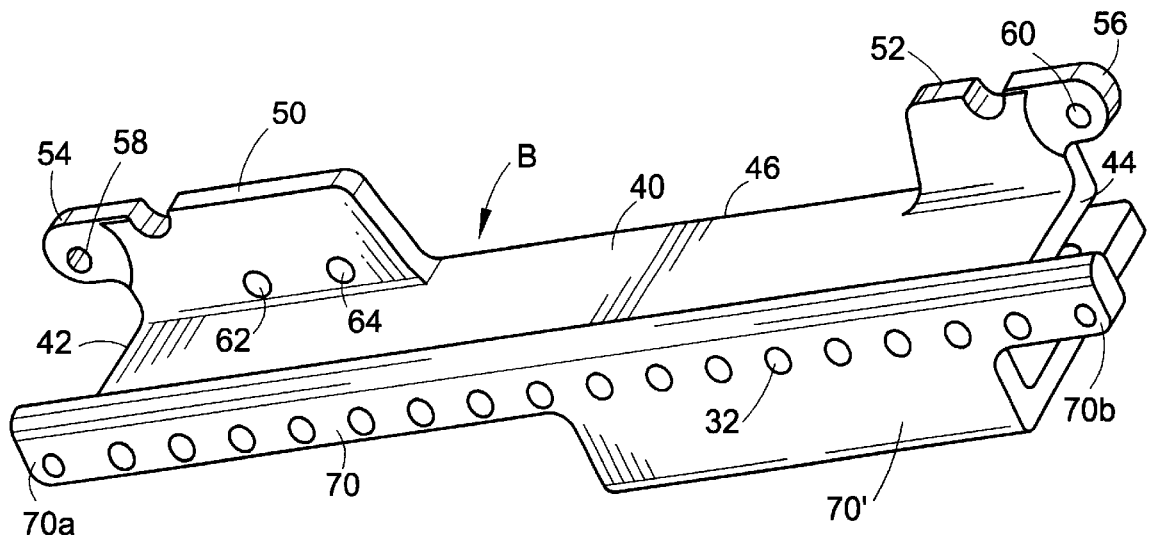
FIG. 3 is a perspective illustration of a one-piece cast copper power supply bus bar used in the distribution panel of FIGS. 1 and 2.
Figure 4:
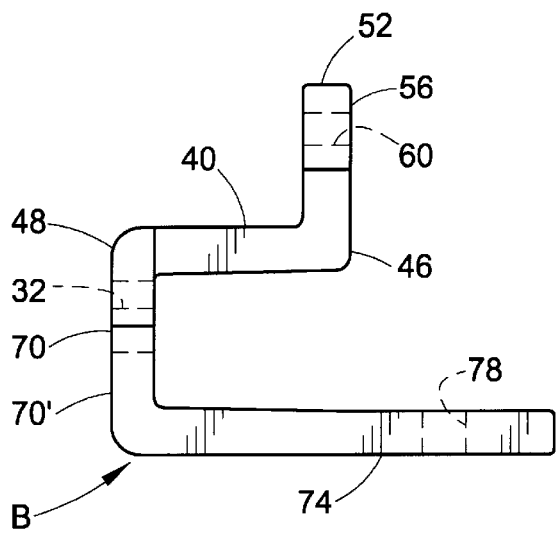
FIG. 4 is an end elevational view thereof.
Figure 7:
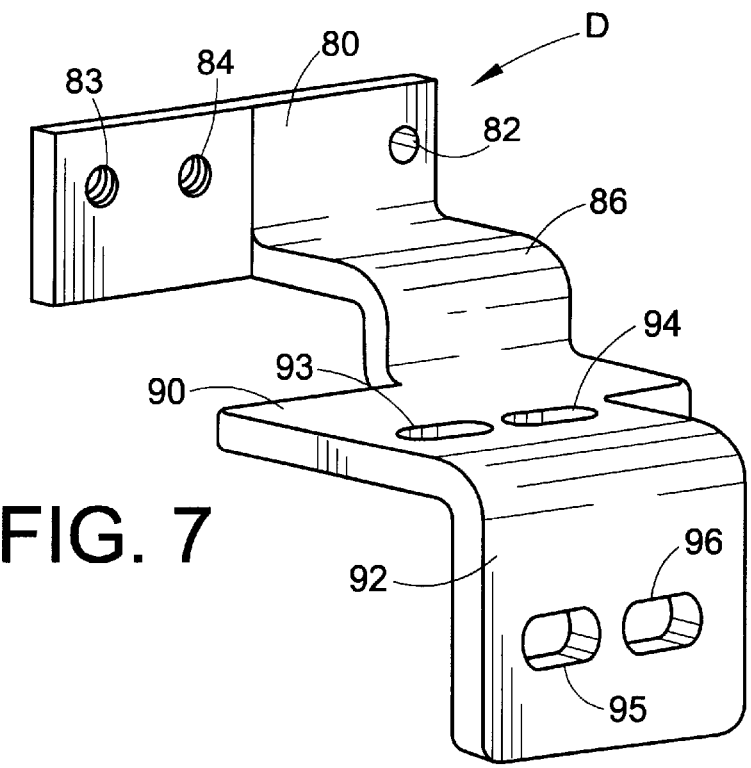
FIG. 7 is a perspective illustration of a power input connector used in the distribution panel of FIGS. 1 and 2.
Figure 8:
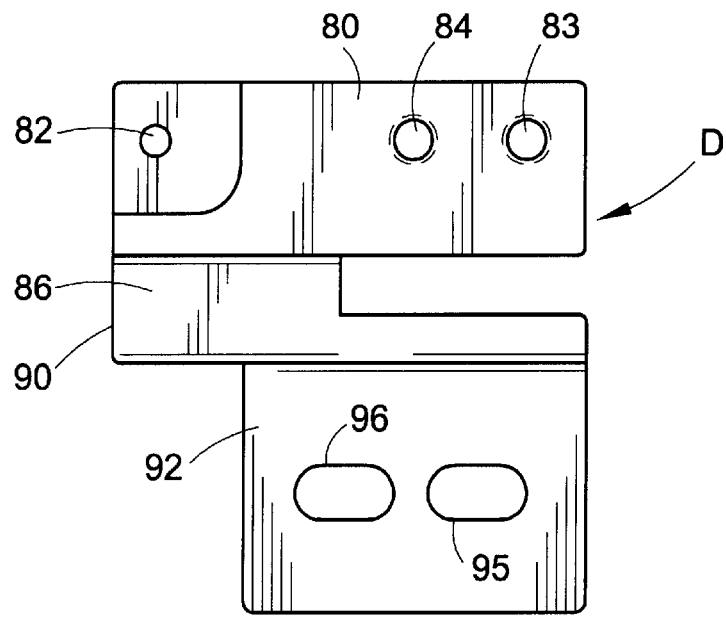
FIG. 8 is a front elevational view thereof.
Figure 12:
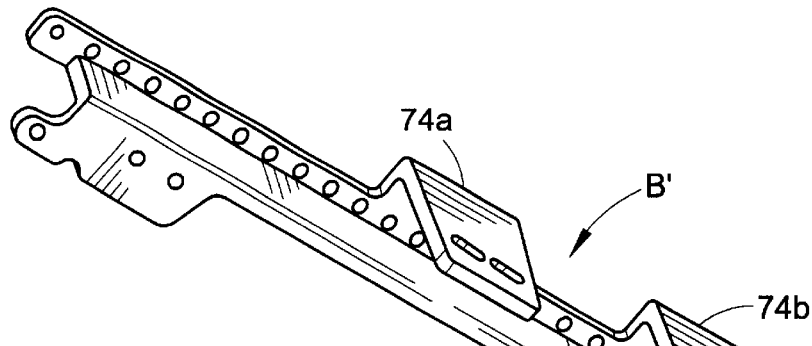
FIG. 12 is a perspective illustration of a modified one-piece cast copper power supply bus bar.
Figure 13:
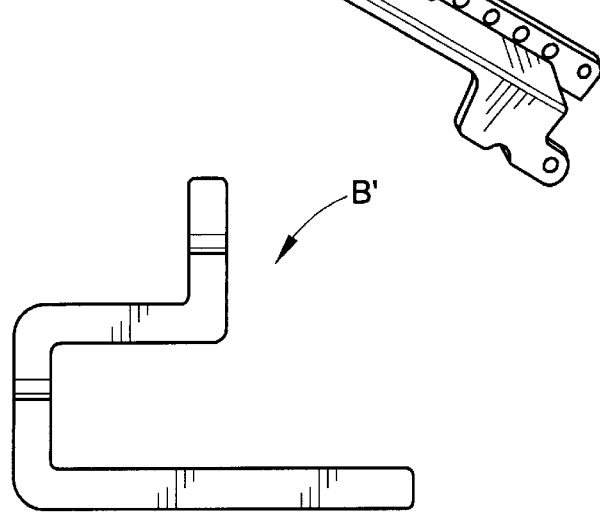
FIG. 13 is an end elevational view thereof.

Referring now to the drawing, wherein the showings are for purposes of illustrating certain preferred embodiments of the invention only and not for purposes of limiting same, FIGS. 1 and 2 show a telecommunications power distribution panel A having a one-piece cast metal power supply bus bar B attached to a flat support C of electrical insulating material such as fiberglass reinforced plastic.

A power supply connector D attached to support C is connected with bus bar B through a resistive shunt E having electrical leads 14, 16 attached thereto for connection to a suitable instrument for measuring, indicating and monitoring the current flowing to the power supply bus bar.

A plurality of spaced-apart parallel metal power distribution blocks are attached to support C. All of the distribution blocks are the same and only one such block is identified by numeral 20 FIGS. 1 and 2. Each terminal block has tapped holes 22, 24 therein for receiving screws 26, 28 that extend through suitable holes in support C from the backside of the support to the front side thereof where the distribution blocks are located. In the arrangement shown in FIGS. 1 and 2, there are 16 distribution blocks, and it will be recognized that a greater or smaller number of distribution blocks may be provided depending on the use to which the power distribution panel will be put.

Each distribution block has a connector receiving hole therein for receiving a bullet connector and only one such hole is generally indicated at 30 in FIG. 2. Bus bar B has corresponding holes therein, only one of which is generally indicated at 32. Bus bar B has a connector receiving hole adjacent to each connector receiving hole in a distribution block, and the connector receiving holes in the power distribution blocks and in the power supply bus bar are centered on the longitudinal axis of each distribution block.

FIGS. 3–6 show bus bar B as having a flat rectangular base 40 with parallel opposite ends 42, 44 and parallel opposite sides 46, 48 that extend perpendicular to opposite ends 42, 44. Mounting flanges 50, 52 extend outwardly perpendicular to base 40 along side 46 adjacent opposite ends 42, 44. Each mounting flange 50, 52 has a mounting ear 54, 56 thereon extending outwardly beyond opposite base ends 42, 44. Each mounting ear 54, 56 has a fastener receiving hole 58, 60 for attachment to dielectric support C of FIGS. 1 and 2. Mounting flange 50 has a pair of spaced-apart tapped holes 62, 64 therethrough adjacent base 40 for receiving fasteners to connect resistive shunt E of FIGS. 1 and 2 thereto.

A power distribution flange 70 extends from opposite side 48 of base 40 perpendicular thereto and in an opposite direction from mounting flanges 50, 52. Power distribution flange 70 has a plurality of equidistantly-spaced connector receiving holes therein, only one of which is indicated at 32. In the arrangement illustrated, there are 16 connector receiving holes in distribution flange 70. The holes extend through distribution flange 70 closely adjacent bus bar base 40 and on the opposite side of base 40 from bus bar mounting flanges 50, 52.

Power distribution flange 70 has projecting end portions 70a, 70b that project outwardly beyond base opposite ends 42, 44, so that the length of distribution flange 70 is greater than the length of base 40 between its opposite ends 42, 44.

Power distribution flange 70 has an integral extension portion 70' extending therefrom along a portion of the length thereof intermediate its opposite ends. An integral splice flange 74 extends from extension flange 70' in parallel spaced-apart relationship to base 40. Both base 40 and splice flange 74 extend in the same direction from distribution flange 70. Splice flange 74 also has a length substantially greater than the width of base 40 between its opposite sides 46, 48.

By way of example, in one design that has been used, the distance between the outer surfaces of distribution flange 70 and mounting flanges 50, 52 is 2.150 inches. The distance from the outside surface of power distribution flange 70 to the end of splice flange 74 is 3.986 inches. Thus, the length of splice flange 74 is approximately 85% greater than the width of base 40. In a preferred arrangement, the length of splice flange 74 is at least 75% greater than the width of base 40.

Splice flange 74 has laterally elongated holes 75–78 therethrough in the portion thereof that extends beyond base 40 for receiving fastener assemblies that connect one or more splice bars to splice flange 74 and to a splice flange on a corresponding power supply bus bar in an adjacent power distribution panel.

Bus bar B preferably is cast in one-piece of copper and has a nominal thickness greater than 0.25 inch. In a preferred arrangement, the nominal thickness of the splice bar is at least 0.350 inches. Splice flange 74 tapers in a direction from distribution flange extension 70' to the end thereof. In one arrangement, the thickness of all the flanges, including the portion of splice flange 74 adjacent to distribution flange extension 70', is about 0.40 inches and splice flange 74 tapers to a thickness of 0.375 inch at its end.

FIGS. 7–11 show power input connector D as having a connecting flange 80 with a fastener receiving hole 82 for connecting flange 80 to support C of FIGS. 1 and 2. Flange 80 also includes tapped holes 83, 84 for receiving fasteners that attach resistive shunt E of FIGS. 1 and 2 thereto. Connector D extends outwardly and downwardly as generally indicated at 86 to horizontal and vertical flange portions 90, 92 having laterally elongated holes 93–96 therethrough for receiving fastener assemblies that attach one or more DC power supply cables to connector D.

FIGS. 12–16 show a different bus bar wherein the same numerals as used in FIGS. 3–6 are used to identify corresponding parts with the addition of a prime. The principal difference between the bus bars of FIGS. 3–6 and FIGS. 12–16 is a matter of size and the use of two spaced-apart splice flanges 74a, 74b that are integral with distribution flange 70 by way of distribution flange extensions 70a, 70b. Splice bar B' is much longer than splice bar B and has more connector receiving holes 32' in its distribution flange 70'. By way of example, whereas splice bar B has only 16 connector receiving holes with a diameter of 0.312 on 0.765 inch centers, bus bar B' has 27 connector receiving holes of the same diameter at the same center spacing.

Figure 17:
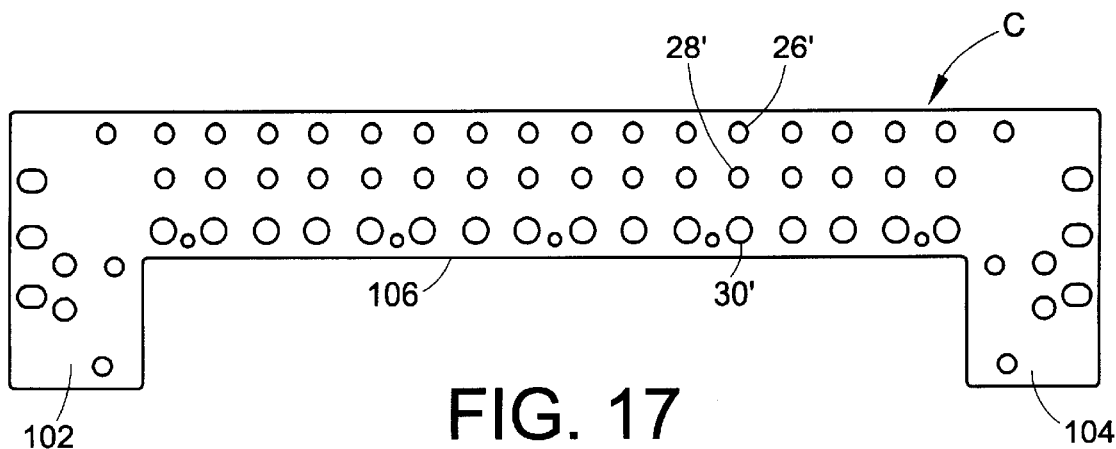
FIG. 17 is an elevational view of an electrical insulating support used in the power distribution panel of FIGS. 1 and 2.
Figure 14:
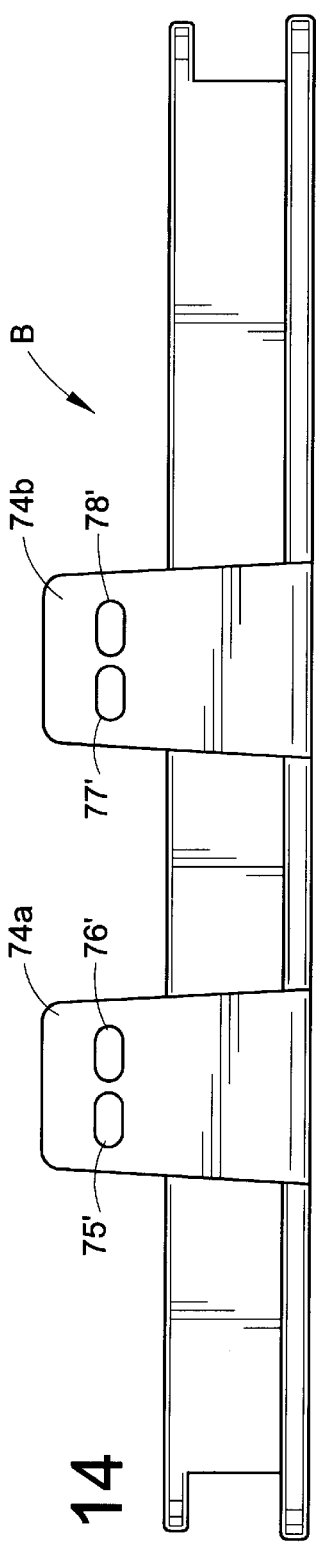
FIG. 14 is a top plan view thereof.
Figure 15:
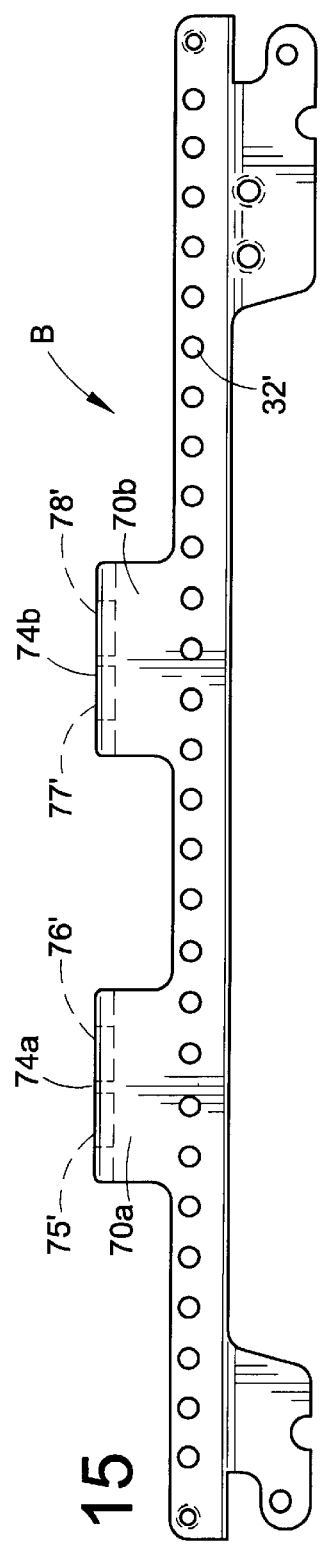
FIG. 15 is a side elevational view thereof.
Figure 16:
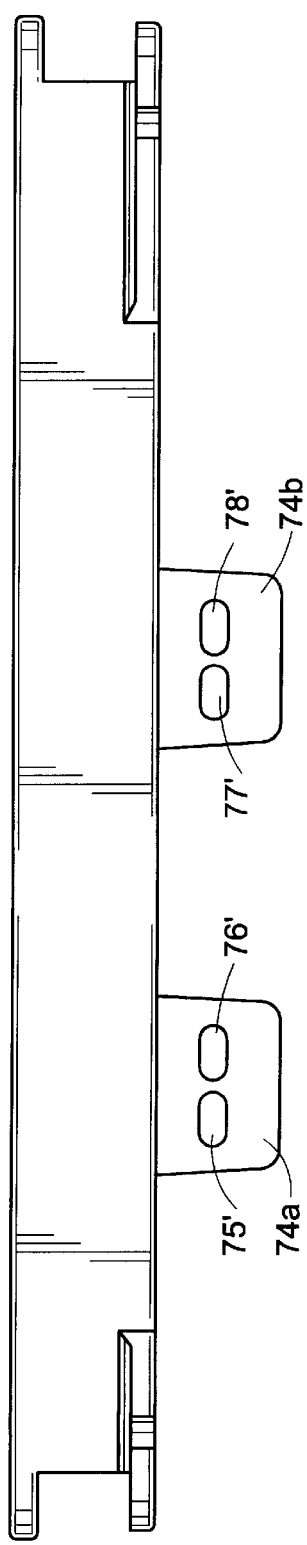
FIG. 16 is a bottom plan view thereof.

FIG. 17 shows flat dielectric support C having extended end portions 102, 104 that define a recess 106 therebetween.

Base 40 of bus bar B is received in recess 106 with mounting flanges 50, 52 located on one side of support C while distribution flange 70 is located on the opposite side of support C. The projecting end portions of power distribution flange 70 overlie support extended end portions 102, 104. Suitable holes are provided in the end portions of support C for receiving fasteners to secure the mounting flanges of the bus bar thereto and for attaching support C to another structural support. Support C has holes therethrough as generally indicated at 26', 28' for receiving fasteners 26, 28 that thread into tapped holes 22, 24 in each power distribution block 20. Additional holes, only one of which is indicated at 30' in FIG. 17, are of the same diameter and are aligned with bullet connector receiving holes 30 in power distribution blocks 20.

FIGS. 18 and 19 show the parts of an electrical bullet connector H. A pin member 108 of silver plated beryllium copper includes a hexagonal head 110 having a cylindrical shank 112 extending therefrom and terminating in a rounded bullet nose 114 that projects slightly radially outwardly beyond cylindrical shank 112 to provide a radial shoulder as generally indicated at 116. A longitudinal central tapped bore 120 extends through hexagonal head 110 into cylindrical shank 112 for receiving a screw 122.

A flat spring metal blank 124' of silver plated beryllium copper in FIG. 19 has flat opposite end portions 128 and 130 between which a plurality of parallel slits 132 are formed to define a plurality of individual spring contacts 134 therebetween. The slits actually have a width by removal of a small amount of metal from the strip so that the spring contacts are slightly spaced from one another. Spring contacts 134 are bowed outwardly as shown in FIG. 18 and the blank of FIG. 19 is formed into a cylinder with cylindrical end portions 128', 130' having an internal diameter slightly smaller than the external diameter of cylindrical shank 112. A narrow longitudinal split 136 in contact member 124' permits outward expansion thereof when its open end is pushed against bullet nose 114 so that the contact can be moved into surrounding relationship with cylindrical shank 112 until it clears shoulder 116 and snaps closed around shank 112 with cylindrical contact portions 128, 130 in firm gripping relationship therewith.

The length between the opposite outer ends of end portions 128', 130' is slightly less than the distance from shoulder 116 to the underside of hexagonal head 110. The outer diameter of outwardly bowed spring contacts 134 is larger than the diameter of holes 30 in the distribution blocks and holes 32 in the splice bar so that the bullet connectors must be forced into the connector holes with a tight fit for good electrical contact. This also contracts cylindrical end portions 128', 130' into firm engagement with cylindrical shank 112 on bullet connector pin 108.

Figure 21:
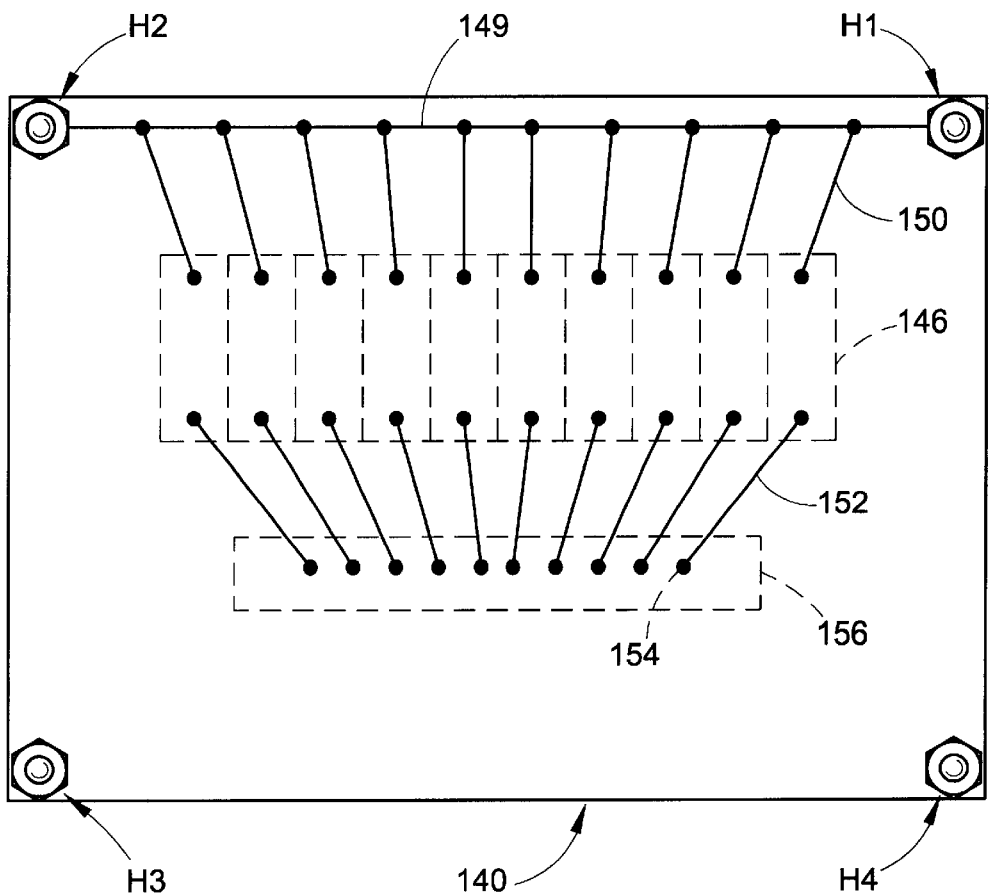
FIG. 21 is a diagrammatic bottom plan view of the circuit board.

FIGS. 20 and 21 shows a flat rectangular circuit board 140 having bullet connectors H1–H4 attached thereto adjacent the four corners thereof. Suitable holes are provided at least adjacent the four corners of board 140 for freely receiving screws 122 which thread into the tapped holes 120 in pins 108 on the opposite side of the board. Additional bullet connectors may be added for higher amperage and/or more secure mounting, and for larger circuit board sizes.

Board 140 has a power distribution circuit thereon that distributes power from the two bullet connectors that are connected with bus bar B to ten different GMT telecommunication fuses 144 that are positioned in a fuse holder 146 on board 140. The circuit is generally indicated in FIGS. 20 and 21 as including a main printed circuit trace 149 interconnects all of the bullet connectors on the circuit board that are received in holes in the bus bar. A plurality of traces, only one of which is identified by a number 150, extend from the power supply bullet connectors to the input connection of fuse sockets for receiving fuses 144. Printed circuit traces 152 extend from the output connections of the fuse sockets to a wire receiving connector 154 on a power output terminal block 156 attached to board 140. Set screws generally indicated at 157 in terminal block 156 are tightened to secure wires thereto within connectors 154.

By way of example, the power supplied from bus bar B to two bullet connectors H1 and H2 on board 140 is distributed to ten different fuse sockets and fuses 144 through the board circuit and then to ten different connectors on power output terminal block 156. Power is supplied to telecommunications equipment by connecting same to terminal block 156. Obviously, more or less than ten fuse sockets and power output connectors may be provided if so desired by increasing or decreasing the length of the circuit board. Additional bullet connectors may be added to the circuit board for higher amperage.

Figure 22:
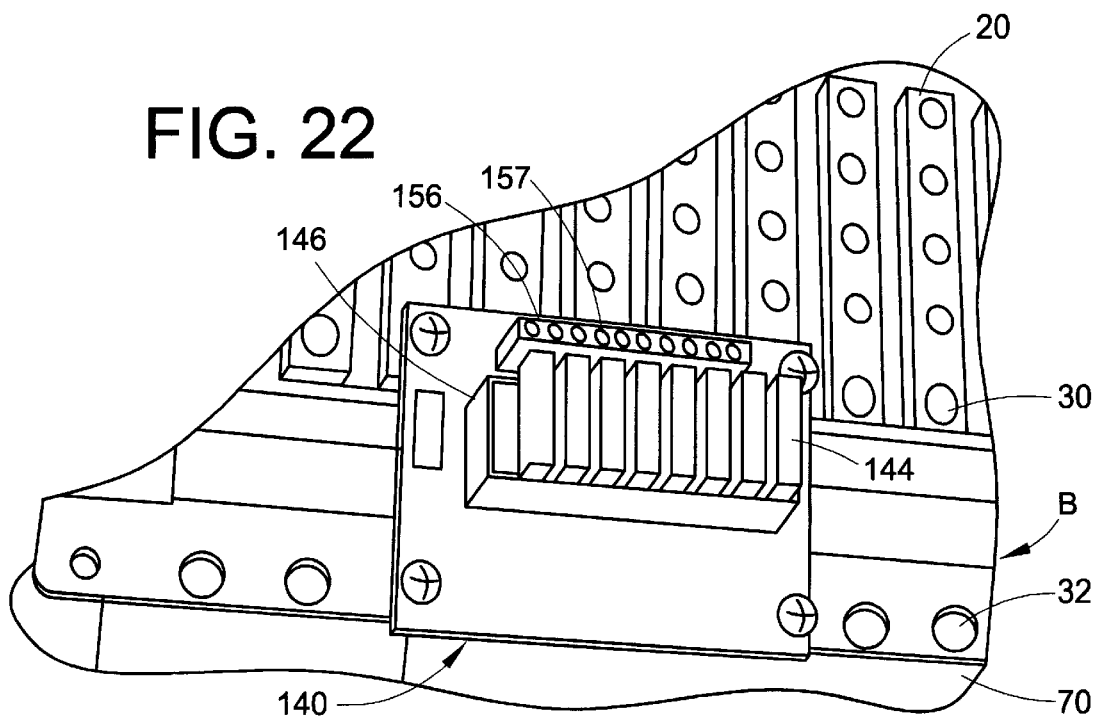
FIG. 22 is a top plan view showing the board of FIG. 20 connected in the power distribution panel of FIGS. 1 and 2.
Figure 23:
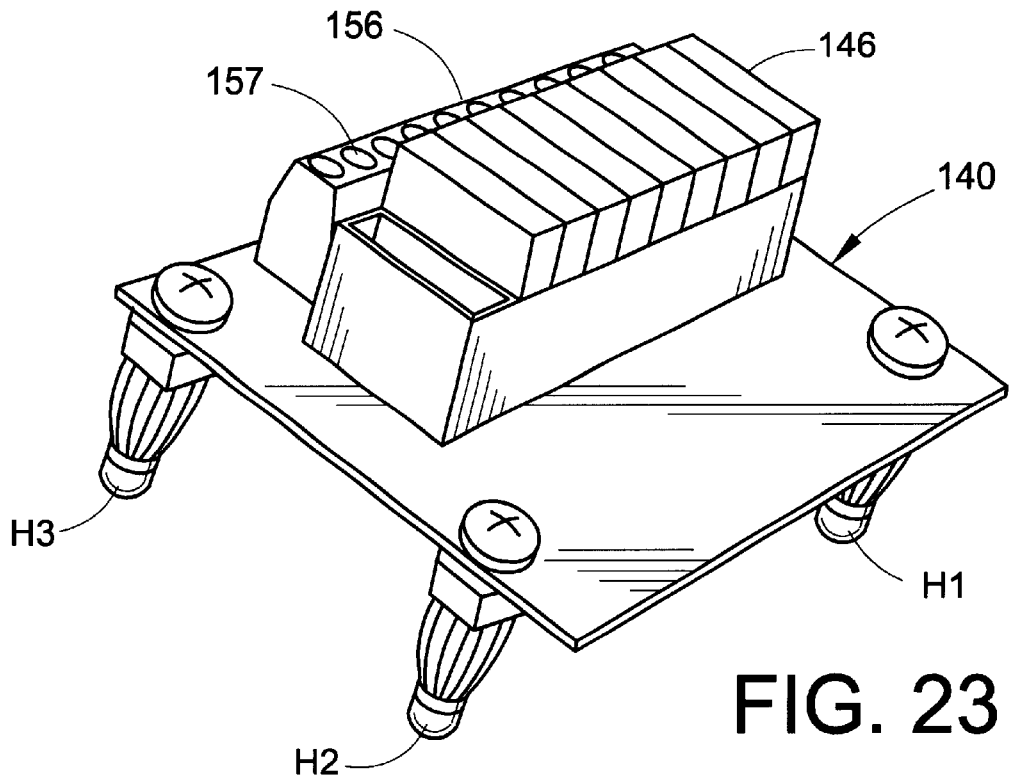
FIG. 23 is a perspective illustration of the power distribution board having bullet connectors thereon.
Figure 24:
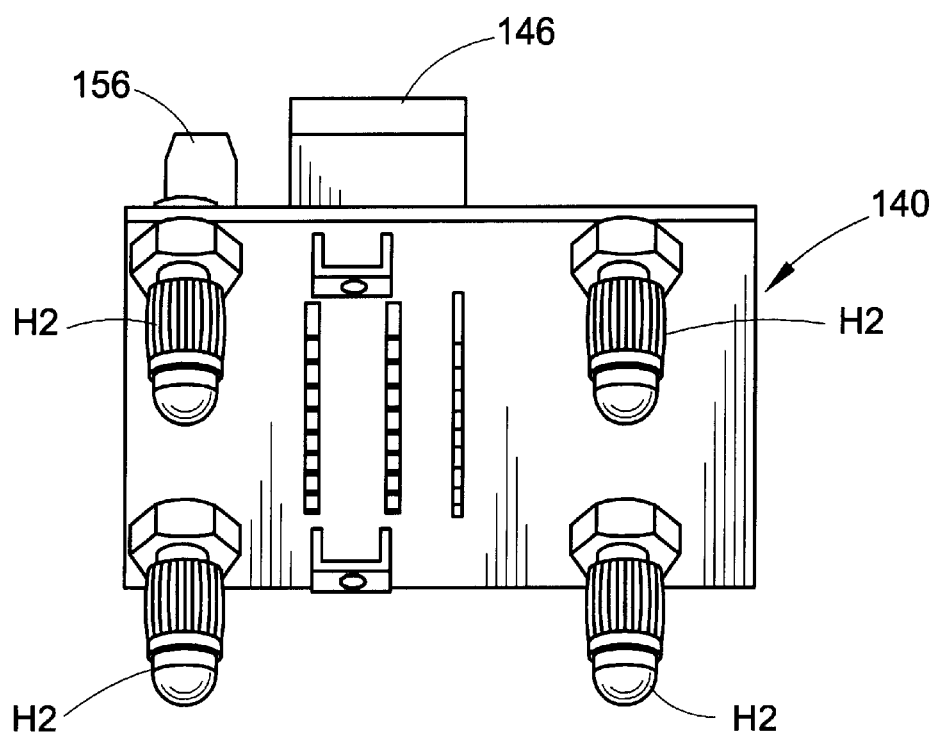
FIG. 24 is another perspective illustration thereof.

FIG. 22 shows circuit board 140 spanning bus bar B and distribution blocks 20, with two of the bullet connectors on board 140 received in holes 32 on distribution flange 70 of bus bar B while the other two bullet connectors on board 140 are received in connector receiving holes 30 on distribution blocks 20. Bullet connectors H3 and H4 that are received in the holes on the small power distribution blocks are dummies because no power is supplied to or from them and they simply serve to hold the circuit board in position.

The circuit board is shown spanning five small power distribution blocks in FIG. 22, and those five blocks do not have power supplied to them. A greater or smaller number of distribution blocks may be spanned by the circuit board depending on the number of fuses or other circuit interrupters on the board and the board size. With terminal block 156 having ten power output connectors, the power distribution circuit board provides two times the number of connections as the number of distribution blocks that are spanned by the circuit board.

All of the remaining power distribution blocks may have power supplied thereto through conventional circuit breakers connected between the bus bar and the distribution blocks or through additional circuit boards. More than two bullet connectors may be attached to the circuit board and plugged into holes in the bus bar to increase the amperage capacity of the fuses or to provide sufficient amperage for a larger circuit board having more fuses or other circuit interrupters.

The improved arrangement of this application permits a customer to use GMT fuses or other circuit interrupters in lieu of circuit breakers connected directly between the bus bar and the small power distribution blocks. The improved bus bar makes it possible to supply at least 600 amps through the bus bar. The diameter of the spring contact arms is greater than the 0.312 inch diameter of the holes in which they are received so that the bullet connectors are a tight fit in the holes and the spring contact arms are in bending stress to provide good electrical contact.

Mounting flanges 50, 52 on bus bar B is attached to dielectric support C of FIGS. 1 and 2 by extending fasteners 170, 172 through the holes in mounting flange ears 54, 56 into spacers 174, 176 that are attached to support C from the opposite side thereof by fasteners 178, 180. Power supply connector D is attached to support C by a fastener 182 that extends into spacer 184 that is attached to support C from the opposite side thereof by fastener 186. Shunt E is attached to power supply connector flange 80 by extending threaded fasteners through suitable holes therein and into tapped holes 83, 84 in flange 80. Shunt E is attached to mounting flange 50 of bus bar B by extending threaded fasteners through suitable holes therein and into tapped holes 62, 64 in mounting flange 50.

The spacing between the facing surfaces of base 40 and splice flange 74 on bus bar B is about 1.739 inch. The length of each mounting flange 50, 52 perpendicular to base 40 from the underside of base 40 to the end of each mounting flange 50, 52 is 1.530 inch. Thus, the spacing between the facing surfaces of base 40 and extension flange 78 is greater than the length of each mounting flange 50, 52. The width of distribution flange 70 perpendicular to base 40 from the upper surface of base 40 to the end of distribution flange 70 is 0.875 inch. Thus, the distribution flange width is less than the length of each mounting flange and of the spacing between the facing surfaces of base 40 and splice flange 74.

Although the invention has been shown and described with reference to certain preferred embodiments, it is obvious that equivalent alterations and modifications will occur to others skilled in the art upon the reading and understanding of this specification. The present invention includes all such equivalent alterations and modifications, and is limited only by the scope of the claims.

We claim:

1. A power distribution circuit board having a plurality of circuit interrupters thereon, a pair of spaced-apart power supply bullet connectors attached to said circuit board and extending outwardly therefrom perpendicular thereto, each said bullet connecting including a pin having a rounded bullet nose tip and a cylindrical shank extending between said tip and said board, a spring contact member surrounding said shank and having a plurality of circumferentially-spaced outwardly bowed spring contacts thereon, said board having a circuit thereon through which power is distributed from said bullet connectors to said plurality of circuit interrupters, a power output terminal block on said circuit board adjacent said circuit interrupters, said terminal block having a plurality of power output connectors thereon, and said circuit connecting each said circuit interrupter with one of said power output connectors on said terminal block.

2. The circuit board of claim 1 wherein said spring contacts have a tight fit in holes of 0.321 inch diameter.

3. The circuit board of claim 1 including a pair of dummy bullet connectors extending from said board for reception in holes in power distribution blocks on a power distribution panel.

4. In a power distribution panel having a power supply bus bar and a plurality or parallel spaced-apart power distribution blocks, each said power distribution block having a hole therein for receiving a bullet connector, said bus bar having a power distribution flange thereon adjacent said power distribution blocks, said power distribution flange having a plurality of spaced-apart holes therein aligned with said block holes for receiving bullet connectors, a power distribution circuit board having a plurality of circuit interrupters thereon, said board having a power output terminal block thereon with a plurality of power output connectors, said circuit board having at least four bullet connectors thereon, a first pair of said bullet connectors being received in a pair of said bus bar holes, a distribution circuit on said board connecting said first pair of bullet connectors with said plurality of circuit interrupters and connecting said circuit interrupters with said terminal block output connectors, a second pair of said bullet connectors being received in a pair of said block holes to connect said circuit board to said power distribution panel and stabilize same thereon, said second pair of bullet connectors being dummies through which no power flows.

5. The power distribution panel of claim 4 wherein each said bullet connector includes an elongated pin having a rounded bullet nose tip and a cylindrical shank extending between said tip and said circuit board, a generally cylindrical spring contact member surrounding said shank, said spring contact member having a plurality of longitudinally extending circumferentially-spaced spring contacts thereon, said spring contacts being outwardly bowed and dimensioned for tightly fitting in said holes in said bus bar and said blocks.

6. The power distribution panel of claim 5 wherein the connection between each said bullet connector and each said hole in said bus bar meets Underwriters Laboratories temperature standards for an amperage rating of at least 70 amps.

* * * * *

UNITED STATES PATENT AND TRADEMARK OFFICE
CERTIFICATE OF CORRECTION

PATENT NO. : 6,359,770 B1
DATED : March 19, 2002
INVENTOR(S) : Kolody et al.

It is certified that error appears in the above-identified patent and that said Letters Patent is hereby corrected as shown below:

Column 6,
Line 58, delete "connecting" insert -- connector --.

Signed and Sealed this

Eighteenth Day of June, 2002

*Attest:*

*Attesting Officer*

JAMES E. ROGAN
*Director of the United States Patent and Trademark Office*